Figure 1:
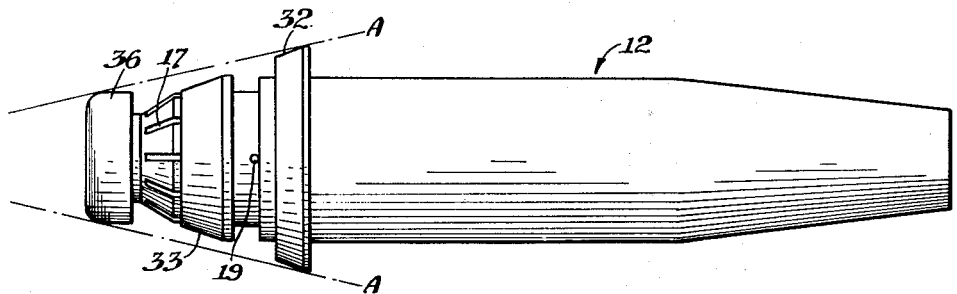

Aug. 22, 1950     C. M. EICHER     2,520,001
CUTTING TORCH TIP
Filed June 6, 1947

Inventor
Clyde M. Eicher
By Brown, Critchlow, Flick & Peckham
his Attorneys.

Patented Aug. 22, 1950

2,520,001

UNITED STATES PATENT OFFICE 2,520,001

CUTTING TORCH TIP

Clyde M. Eicher, Swissvale, Pa., assignor of one-third to Sebastian C. Pugliese, Pittsburgh, Pa., and two-thirds to Universal Tip & Equipment Company, a corporation of Pennsylvania Application June 6, 1947, Serial No. 753,097

2 Claims. (Cl. 158—27.4)

This invention relates to cutting torch tips and, in particular, to tips into which pre-heat oxygen, combustible gas and cutting oxygen are supplied separately.

Cutting torches usually are provided with a head having passages through it for cutting oxygen, the pre-heat oxygen, and a combustible gas and with a recess in which the torch tip fits and is removably attached. The side of such tips is usually provided with seats which cooperate with correspondingly shaped seats formed on the sides of the head's recess to prevent the separate supplies of oxygen and gas from mixing together and causing serious backfires. The cutting oxygen normally flows through aligned ports in the inner end of the recess and the tip, and is supplied to the work through a central axial passage in the tip. The pre-heat oxygen and combustible gas are supplied separately through ports in the side of the recess and flow through apertures into the tip where they mix, and the mixture is supplied to the work through axial passages which surround the cutting oxygen's central passage.

One difficulty with such tips is that, since they ordinarily are made of rather soft metal such as brass or copper, their seats frequently become dented or otherwise injured so that the gases can leak around them and produce backfiring through the passages in the torch head. The damage results from rough handling or dropping when the tip has been removed from the head either for repair, cleaning or to insert a tip of a different size. In this respect, it is to be noted that frequent cleaning of the tips is required principally due to a clogging by flux slag which occurs when the worker brings the end of the tip too close to the work.

It is therefore an object of this invention to provide a torch tip in which injury to the seats by rough handling is substantially avoided.

According to the invention, the inner end of a torch tip is provided with a concave conical seat registering with the cutting oxygen port in the torch head and this seat is surrounded by a lateral flange. The tip also is provided at its side with an intermediate and an outer conical seat which are spaced axially of the tip from each other and also from the concave end seat. The outer conical seat is made of a larger diameter than the intermediate seat and also the flange which surrounds the concave conical seat at the inner end of the tip is given sufficient diameter so that the conical faces of both of the side seats lie wholly within the face of a cone defined by the maximum diameter portions of the outer conical seat and the periphery of the flange. As a result of this proportionment, if the tip is dropped, it will land on the outer periphery of the flange, the outer seat, or both, and, in no event will the conical surfaces of the seats be injured. Also, the end seat is protected in case the tip should land on its inner end since the seat is concave and the impact will be taken by the surrounding flange.

Figure 2:
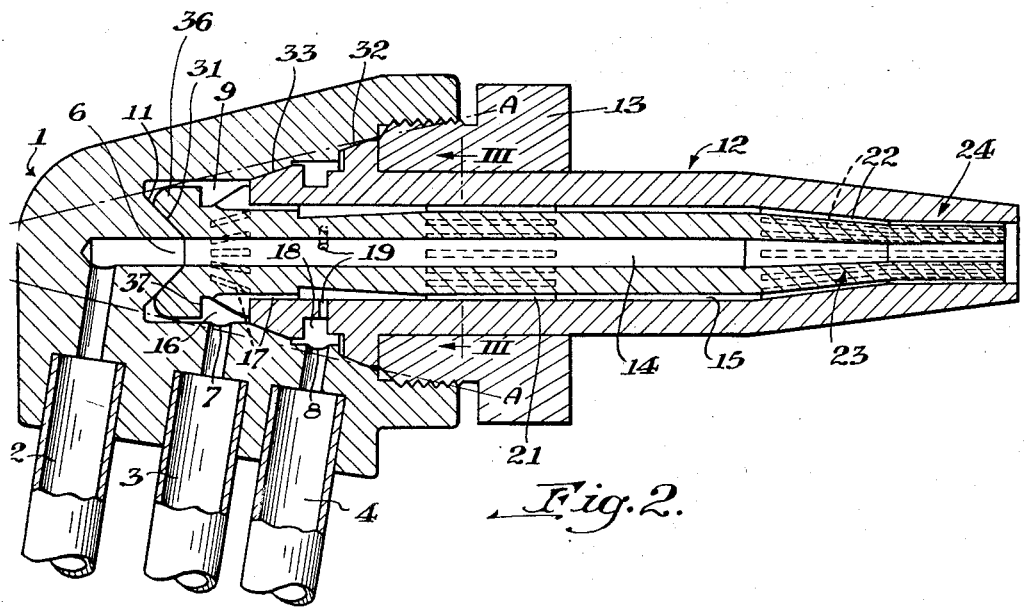
Figure 3:
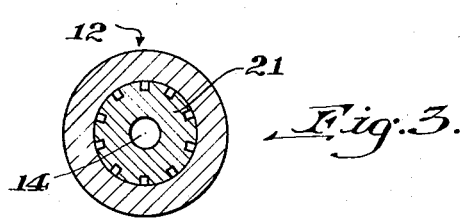

The preferred embodiment of the invention is illustrated in the accompanying drawings, of which Fig. 1 is a side view of the tip; Fig. 2 is an enlarged central section through an assembled tip and torch head; and Fig. 3 is a section taken on the line III—III of Fig. 2.

Referring to the drawings, torch head 1 is of the standard type described above and includes a cutting oxygen passage 2, a low pressure pre-heat oxygen passage 3 and a low pressure gas passage 4 having ports 6, 7 and 8, respectively, leading into a tip-receiving recess 9. For purposes which will become apparent, the inner end of the recess is provided with a convex conical seat 11 which surrounds cutting oxygen port 6. To prepare the torch for cutting, a torch tip 12 of suitable size is inserted into recess 9 and removably attached therein by a nut 13 which screws into threads formed on the outer end of the recess.

Aside from the improvements of this invention, the tip is constructed in accordance with known practice. Thus, it is provided with a central axial passage 14 which aligns with cutting oxygen port 6 to deliver the cutting oxygen to the work. Surrounding passage 14 is a smaller axial passage 15 which leads the mixed pre-heat combustible gas and low pressure oxygen to the work in order to bring the work to a high temperature prior to the cutting operation. The pre-heat oxygen flows through port 7 in the head and into an undercut portion 16 in the tip from which it continues through narrow slit openings 17 into axial passage 15. Similarly, the low pressure gas flows through port 8 into an undercut portion 18 in the tip and continues through three small openings 19 into axial passage 15. Prior to being delivered to the work, the low pressure oxygen and combustible gas mix together and, as the mixture passes through passage 15, it is further mixed by being led through slots formed in a collar 21 and through grooves 22 which are similar to the collar slots and are formed at the outer end of axial passage 15. Such further mixing is desirable when using low pressure gases such as butane or natural gas and, to facilitate the machining of the slots and grooves, the tip may be made in two tubular parts 23 and 24, the mixing passages being formed on inner part 23. After the separate parts have been machined, they are press fitted together as a normally inseparable unit. However, if the tip is designed for use in an acetylene torch, such further mixing is not necessary and the tip can be made as a single piece.

The feature of this invention lies in the protection of the seats against injury due to rough handling or dropping. The tip is provided at its inner end with a concave conical seat 31 which fits against convex seat 11 formed on the inner end of the recess and also with an outer conical seat 32 and an intermediate conical seat 33. The recess, of course, is provided with conical surfaces against which outer and intermediate conical seats 32 and 33 abut. Surrounding the concave conical seat at the inner end of the tip is lateral flange 36, the outer face 37 of which is cut back to form undercut portion 16 of the tip. Protection is provided for the conical faces of the seats by making the diameter of outer conical seat 32 sufficiently larger than that of intermediate conical seat 33, and also projecting lateral flange 36 laterally to such an extent that the conical faces of the seats lie wholly within the face of a cone defined by the maximum diameter portion of the outer conical seat and the periphery of the flange. The reason for such relative proportionment is more apparent from a consideration of Fig. 1 in which broken lines A define a cone drawn through the above-mentioned maximum diameter portion of the outer conical seat and the periphery of the flange. As there seen, the conical faces of seats 32 and 33 lie wholly within this cone so that if the tip is dropped carelessly, it will land on the maximum diameter portion of the outer seat or the periphery of the flange, or both, and the conical faces can not be injured. Further, if the tip lands on its inner end, flange 36 will bear the impact and protect concave conical seat 31 from injury. Consequently, the conical seats will not become damaged when dropped or roughly handled and there can be no leakage around them which might cause serious backfires or explosions.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a cutting torch, the combination with a head having ports therein for the passage of cutting oxygen and pre-heat oxygen and combustible gas, respectively, said head having a tip-receiving recess and being provided at the end of such recess with a convex conical seat surrounding the inner end of said cutting oxygen port and on the side wall of such recess with two spaced conical seats, and a removable tip attached to said head and being provided at its inner end with a concave conical seat having a lateral flange surrounding it and at its side with an intermediate seat and with an outer conical seat spaced from each other and from said concave end seat axially of the tip, said outer conical seat being of larger diameter than said intermediate seat and said flange being projected laterally to such an extent that the conical faces of said seats lie wholly within the face of a cone defined by the maximum diameter portion of said outer conical seat and by the periphery of said flange.

2. In a cutting torch, the combination with a metal head having ports therein for the passage of cutting oxygen and pre-heat oxygen and combustible gas, respectively, said head having a tip-receiving recess and being provided at the end of such recess with a convex conical seat surrounding the inner end of said cutting oxygen port and on the side wall of such recess with two spaced conical seats, and a removable metal tip inserted into said head and being provided at its inner end with a concave conical seat having a lateral flange surrounding it and at its side with an intermediate seat and with an outer conical seat spaced from each other and from said concave end seat axially of the tip, said outer conical seat being of larger diameter than said intermediate seat, and said flange being projected laterally to such an extent that the conical faces of said seats lie wholly within the face of a cone defined by the maximum diameter portion of said outer conical seat and by the periphery of said flange, and a nut mounted on said tip and threaded onto said head, said nut pressing against said tip and holding said convex and concave conical seats in a tightly sealed engagement whereby leaks across said seat due to expansion of the metal of the head are avoided.

CLYDE M. EICHER.

REFERENCES CITED

The following references are of record in the file of this patent:

UNITED STATES PATENTS

| Number | Name | Date |
|---|---|---|
| 1,235,902 | Kearny | Aug. 7, 1917 |
| 1,731,265 | Quelch | Oct. 15, 1929 |
| 1,745,115 | Ost | Jan. 25, 1930 |
| 1,850,379 | Campbell | Mar. 22, 1932 |
| 2,192,661 | Jones | Mar. 5, 1940 |